United States Patent Office.

JOSEPH L. HALLIMAN, OF GRAND RAPIDS, MICHIGAN.

Letters Patent No. 89,654, dated May 4, 1869.

IMPROVED MEDICATED CRACKER.

The Schedule referred to in these Letters Patent and making part of the same.

*To whom it may concern:*

Be it known that I, JOSEPH L. HALLIMAN, of Grand Rapids, in the county of Kent, and State of Michigan, have invented a new and useful Improvement in Medicated Crackers; and I do declare that the following is a true and accurate description thereof.

The nature of this invention relates to the preparation and baking of a cracker, round, square, or of any other desirable form, and consists in adding to the usual ingredients certain articles and medicaments, as more fully hereinafter set forth.

In the preparation of my cracker-dough, I use thirty (30) pounds of lard to one barrel of flour, mixed together with thirty (30) quarts of water, a suitable quantity of yeast, and one (1) pound of salt.

To every ten (10) pounds of the dough I add one and a half (1½) ounce of pulverized rhubarb, one (1) quart of molasses, one-half (½) pint of extract of wild-cherry bark, and one (1) ounce of saleratus. Mix thoroughly, and bake in the usual way.

One or more of these crackers, eaten after or with every meal, will be found to relieve and effectually cure costiveness, indigestion, and similar derangements of the stomach.

No evil effects will arise from eating a hearty meal, at any time, night or day, if a few of these crackers are eaten afterward.

Should a person eat a large quantity of them, no possible harm can arise therefrom.

What I claim as my invention, and desire to secure by Letters Patent, is—

A medicated cracker, when composed of the ingredients and substantially in the proportions herein set forth, for the purpose described.

JOSEPH L. HALLIMAN.

Witnesses:
OMAR H. SIMONDS,
EDWARD TAGGART.